(12) United States Patent
Tanaka et al.

(10) Patent No.: US 7,113,548 B2
(45) Date of Patent: Sep. 26, 2006

(54) OFDM TRANSMISSION SYSTEM TRANSCEIVER AND METHOD

(75) Inventors: Makoto Tanaka, Kariya (JP); Kazuoki Matsugatani, Kariya (JP)

(73) Assignee: Denso Corporation, Kariya (JP)

( * ) Notice: Subject to any disclaimer, the term of this patent is extended or adjusted under 35 U.S.C. 154(b) by 715 days.

(21) Appl. No.: 10/160,097

(22) Filed: Jun. 4, 2002

(65) Prior Publication Data

US 2002/0196734 A1 Dec. 26, 2002

(30) Foreign Application Priority Data

Jun. 7, 2001 (JP) ............................. 2001-173035

(51) Int. Cl.
| | |
|---|---|
| H04B 7/02 | (2006.01) |
| H04B 17/02 | (2006.01) |
| H04B 7/10 | (2006.01) |
| H04B 1/02 | (2006.01) |
| H04B 1/38 | (2006.01) |
| H04L 27/04 | (2006.01) |

(52) U.S. Cl. ..................... 375/267; 375/299; 375/347; 375/296; 375/219; 455/101; 455/137; 455/73

(58) Field of Classification Search ................ 375/316, 375/295, 296, 267, 347, 299, 219, 222, 260; 455/69, 101, 132, 137, 73, 91, 130, 84; 370/208, 370/210

See application file for complete search history.

(56) References Cited

U.S. PATENT DOCUMENTS 6,249,250 B1 6/2001 Namekata et al.
6,615,024 B1 * 9/2003 Boros et al. ............. 455/67.14
2005/0020313 A1 * 1/2005 Chae et al. ............. 455/562.1

FOREIGN PATENT DOCUMENTS

| JP | A-2000-174536 | 6/2000 |
|---|---|---|
| JP | A-2000-209017 | 7/2000 |

* cited by examiner

*Primary Examiner*—Tesfaldet Bocure
(74) *Attorney, Agent, or Firm*—Posz Law Group, PLC

(57) ABSTRACT

An frequency division multiplexing (OFDM) system transceiver for transmitting frequency dividing data in parallel includes antenna elements for receiving known reception and reception data signals. The fast Fourier transforms (FFTs) transform the known reception signals and the reception data signals to obtain known reception sub-carrier signals and reception data sub-carrier signals. The estimator estimates propagation path estimating values of each of the reception data sub-carrier signals with respect to each of the known reception sub-carrier signals. The weight calculator calculates a maximum ratio composition weight to composite the reception data sub-carrier signals. The setting means sets a transmission weight based on the maximum ratio composition weight. The generator generates a transmission data signal by arranging transmission sub-carrier signals on the frequency axis. The multipliers multiply the transmission data signals by the transmission weight and output the multiplied resultant to the respective antenna elements.

14 Claims, 8 Drawing Sheets

FIG. 2

$$W = \left\{ \begin{array}{ccccc} \dfrac{h_1(l,1)}{|h_1(l,1)|^2} & \dfrac{h_1(l,2)}{|h_1(l,2)|^2} & \cdots & \dfrac{h_1(l,k)}{|h_1(l,k)|^2} \\ \dfrac{h_2(l,1)}{|h_2(l,1)|^2} & \dfrac{h_2(l,2)}{|h_2(l,2)|^2} & & \\ \vdots & \vdots & & \vdots \\ \dfrac{h_i(l,1)}{|h_i(l,1)|^2} & \dfrac{h_i(l,2)}{|h_i(l,2)|^2} & \cdots & \dfrac{h_i(l,k)}{|h_i(l,k)|^2} \end{array} \right\} = \left\{ \begin{array}{ccccc} A_{11}\exp(j*\theta_{11}) & A_{12}\exp(j*\theta_{12}) & \cdots & A_{1k}\exp(j*\theta_{1k}) \\ A_{21}\exp(j*\theta_{21}) & A_{22}\exp(j*\theta_{22}) & & \\ \vdots & \vdots & & \vdots \\ A_{i1}\exp(j*\theta_{i1}) & A_{i2}\exp(j*\theta_{i2}) & \cdots & A_{ik}\exp(j*\theta_{ik}) \end{array} \right\}$$

$$P = [P(l,1) \quad P(l,2) \quad \cdots \quad P(l,k)]$$

$$P(l,k) = \sum_{i=1}^{M} |h_i(l,k)|^2$$

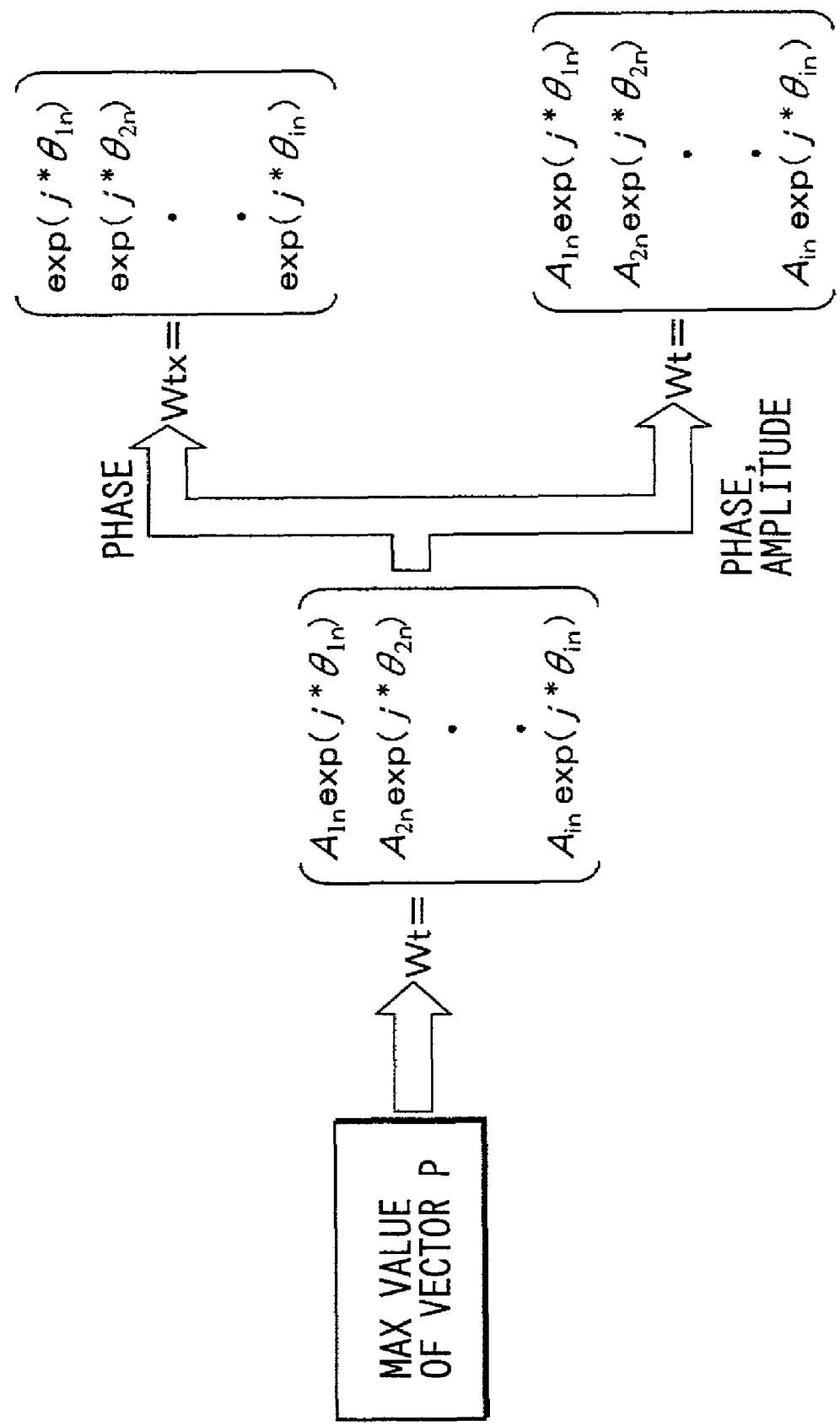

$$\text{ESTIMATING VALUE} = \frac{\text{RECEIVED KNOWN SIGNAL}}{\text{KNOWN SIGNAL}}$$

OFDM TRANSMISSION SYSTEM TRANSCEIVER AND METHOD

CROSS REFERENCE TO RELATED APPLICATION

This application is based upon and claims the benefit of Japanese Patent Application No. 2001-173035 filed on Jun. 7, 2001, the contents of which are incorporated herein by reference.

FIELD OF THE INVENTION

The present invention relates to a transceiver and transmission method using OFDM (Orthogonal Frequency Division Multiplexing) transmission system that transmits frequency division data in parallel.

BACKGROUND OF THE INVENTION

Conventionally, an OFDM modulation system is utilized for transmitting large capacity information in parallel. Such a system can transmit one type of data over a long time period, thereby reducing the effects of frequency selectivity phasing.

Further regarding an OFDM system, carrier intervals are shortened on a frequency axis, thereby improving frequency usability. Also, a copy signal of a symbol referred to as a guard interval is attached to the symbol. Therefore, it is possible to prevent symbols from interfering with one another when delayed radio waves are received.

Normally, the OFDM system rebuilds a sub-carrier signal, which includes errors introduced by frequency selectivity phasing, by error correction using other sub-carrier signal information. Accordingly, high precision error correction is required because transmitted data tends to delay spread. In such a case, however, several codes are required for error correction, thereby substantially decreasing signal transmission speed.

To avoid the above-mentioned decrease in signal transmission speed, conventional transceivers utilize an OFDM system with diversity reception. The diversity reception would enable the transceiver to select an appropriate signal from several signals received by several antennas. The transceiver can obtain a highest quality maximum-ratio-combining that maximizes the signal to noise ratio of respective sub-carrier signals.

Specifically, in the transceiver, sub-carrier information in the received signal can be rebuilt using identical sub-carrier signal received at the other antennas even if the received signal level of an antenna decreases. Accordingly, high quality information can be obtained without the need for high precision error correction.

An exemplary transceiver using an OFDM system with maximum ratio combining is described. Referring to FIGS. 7–9C, the transceiver has antenna elements 10–13, serial-parallel (S/P) converters 20–23, Fast Fourier Transformers (FFTs) 30–33, propagation path estimators 40–43, a weight calculator (maximum ratio combining weight calculators) 50, a maximum ratio combining processor 60, a demodulator 70 and a parallel-serial (P/S) converter 80.

Also, an example format of the OFDM signal is described. Referring to FIG. 8, a signal (timing signal) T that is for detecting signal timing and a signal (path signal) CS that is for estimating a propagation path are disposed before respective available symbols D1–DN (N is positive integer) on a frequency axis.

The timing signal T is a predetermined signal periodically transmitted in the time domain. The path signal CS has known sub-carrier signals arranged in a predetermined order in the time domain. The available symbols D1–DN include data symbols (Data (1)-Data ($N_{sym}$)) and guard intervals GI that are arranged before each of the data symbols. The data symbols D1–DN have frequency domain sub-carrier signals (data sub-carrier signals). The guard intervals GI are copies of data with respect to predetermined positions of respective data symbols D1–DN in which the guard intervals GI are provided. Incidentally, the available symbols are digital date modulated by a technique such as by BPSK, QRSK, 16 QAM or the like.

In FIG. 7, respective OFDM signals received by the antenna elements 10–13 are amplified and frequency converted by an RF/IF circuit (not shown). The resultant signals are input to a vector demodulator (not shown) and are demodulated to I and Q where I and Q correspond to real and imaginary numbers respectively. The I and Q are then processed by a synchronizing process, an AFC (Auto Frequency Control) process, a guard interval removing process or the like.

Further, respective resultant signals after the guard interval process are serial-parallel converted by the S/P converters 20–23. The parallel signals are then input into respective FFTs 30–33 which in turn generate demodulated OFDM signals.

In the OFDM demodulation, the FFTs 30–33 calculate respective known sub-carrier signals of the path signals CS and respective data sub-carrier signals of the available symbols because the OFDM signals include the path signal CS and available symbols D1–DN in the time domain.

Exemplary data sub-carrier signals calculated by the FFTs 30–33 are shown in FIGS. 9A–9C. In FIG. 9A, the horizontal axis shows frequency, and codes DS1–DS6 are respective data sub-carrier signals calculated by the FFTs 30–33. Phases and amplitudes of the data sub-carrier signals of the OFDM signals are different from each other even if the signals are simultaneously received. This is because the OFDM signals are deformed through the propagation path.

Accordingly, the data sub-carrier signals are compensated by the propagation path estimators 40–43 using, for example, the path signals DS1–DS6. The propagation path estimators 40–43 are provided for respective elements and replicate the known sub-carrier signals of the path signals CS. The propagation path estimators 40–43 complex-divide respective data sub-carrier signals, which are calculated by the FFTs 30–33, using the replicas of the known sub-carrier signals to thereby calculate propagation path estimating values of respective known sub-carrier signals that indicate frequency features of propagation path. In other words, the propagation path estimators 40–43 calculate the respective propagation path estimating values by dividing the received path signals CS by the respective replicas of the known sub-carrier signals.

The weight calculator 50 calculates the maximum ratio combining weight W using the propagation path estimating a value of respective sub-carrier signals. The weight W is shown in mathematical expression (1) below as a matrix of (number of the antenna elements)×(number of the data sub-carrier signals), where the propagation path estimating value is $h_r(l, k)$ whose antenna element number is "i", available symbol number is "l" and data sub-carrier signal number is "k".

$$W = \begin{pmatrix} \dfrac{h_1(f,1)}{|h_1(f,1)|^2} & \dfrac{h_1(f,2)}{|h_1(f,2)|^2} & \cdots & \dfrac{h_1(f,k)}{|h_1(f,k)|^2} \\ \dfrac{h_2(f,1)}{|h_2(f,1)|^2} & \dfrac{h_2(f,2)}{|h_2(f,2)|^2} & \cdots & \dfrac{h_2(f,k)}{|h_2(f,k)|^2} \\ \vdots & \vdots & & \vdots \\ \dfrac{h_i(f,1)}{|h_i(f,1)|^2} & \dfrac{h_i(f,2)}{|h_i(f,2)|^2} & \cdots & \dfrac{h_i(f,k)}{|h_i(f,k)|^2} \end{pmatrix} \quad (1)$$

As shown in mathematical expression (1), respective elements of the weight W correspond to the respective data sub-carrier signals and are divided by an amount of the respective propagation path estimating values (square of the respective propagation path estimating values). The maximum ratio combining processor 60 maximum-ratio-combines the data sub-carrier signals using the weight W.

The resultant signal Z(l,k) generated by maximum-ratio-combining is shown in mathematical expression (2), where the sub-carrier signal is Xi(l,k) whose antenna element number is "i", available symbol number is "l" and data sub-carrier signal number is "k". Also, a total antenna element number is M and * means complex conjugate.

$$z(f,k) = \dfrac{\sum_{i=1}^{M} hi*(f,k)xi(f,k)}{\sum_{i=1}^{M} |hi(f,k)|^2} \quad (2)$$

In the maximum-ratio-combining, the change of the identical data sub-carrier signals of the respective antenna elements 10–13 is compensated for using the propagation path estimating values. Thus, the maximum ratio combining processor 60 outputs combining signals z(l,k) with respect to each data sub-carrier signal.

The demodulator 70 digitally demodulates the combining signals z(l,k) using BPSK, QPSK, 16QAM or the like. Then, the P/S converter 80 converts the parallel demodulated signals z(l,k) to obtain serial demodulated data.

As mentioned above, the maximum ratio combining increases the signal levels of the received signals and decreases corresponding noise levels thereof. Namely, regarding the antennas 10–13, increasing the received signal level directs the main beam for reception toward a high signal energy direction. Also, decreasing the noise signal level decreases the side lobe levels. Accordingly, it is possible to direct the main beam for reception toward the target direction.

The above-mentioned receiver can direct the main beam for reception using the maximum ratio combining weight. That is, the reception beams of the antennas 10–13 are formed using the maximum ratio combining weight.

However, a transceiver that can direct a main beam for transmission in the same direction as that of the transmitter is not suggested.

SUMMARY OF THE INVENTION

It is therefore an object of the present invention to provide a transceiver that is capable of obviating the above problem.

It is another object of the present invention to provide a transceiver having a transmitter that is capable of directing the main beam for transmission toward the same main beam for reception of that of receiver.

According to this invention, a transceiver has antenna elements, FFTs, estimators, a weight calculator, setting means and a generator. The antenna elements receive known reception signals including a known reception sub-carrier signals and reception data signals including reception sub-carrier signals. The FFTs transform the known reception signals and the reception data signals, and obtain the known reception sub-carrier signals and the reception data sub-carrier signals.

The estimator estimates propagation path estimating values for each of the reception data sub-carrier signals with respect to each of the known reception sub-carrier signals based on each of the known reception sub-carrier signals. The weight calculator calculates a maximum ratio combining weight to combine the reception data sub-carrier signals of each of the antenna elements based on the propagation path estimating signals of each of the known reception sub-carrier signals.

The setting means sets a transmission weight based on the maximum ratio combining weight. The generator generates a transmission data signal by arranging transmission sub-carrier signals on the frequency axis. The multipliers multiply the transmission data signals by the transmission weight and output the multiplied resultant to the respective antenna elements.

Accordingly, the transmission weight is set by the setting means based on the maximum ratio combining weight.

The weight calculator may for example calculate respective weights for the antenna elements and the reception data sub-carrier signals as the maximum ratio combining weight. Also, the setting means, for example, may include addition means, a selector and output means. In this case, the addition means calculates respective additional values based on addition scaled values of the respective propagation estimation values and the respective known reception sub-carrier signals. The selector selects a maximum value from the additional scaled values and the weight that corresponds to the maximum value from the maximum ratio combining weight. The output means outputs the selected weight to the multiplier as the transmission weight.

BRIEF DESCRIPTION OF THE DRAWINGS

Other objects, features and advantages of the present invention will be understood more fully from the following detailed description made with reference to the accompanying drawings. In the drawings:

FIG. 2 shows mathematical expressions for explaining operation of the OFDM transceiver according to the first embodiment;

FIG. 3 shows mathematical expressions for explaining operation of the OFDM transceiver according to the first embodiment;

DETAILED DESCRIPTION OF THE PREFERRED EMBODIMENT

Figure 1:
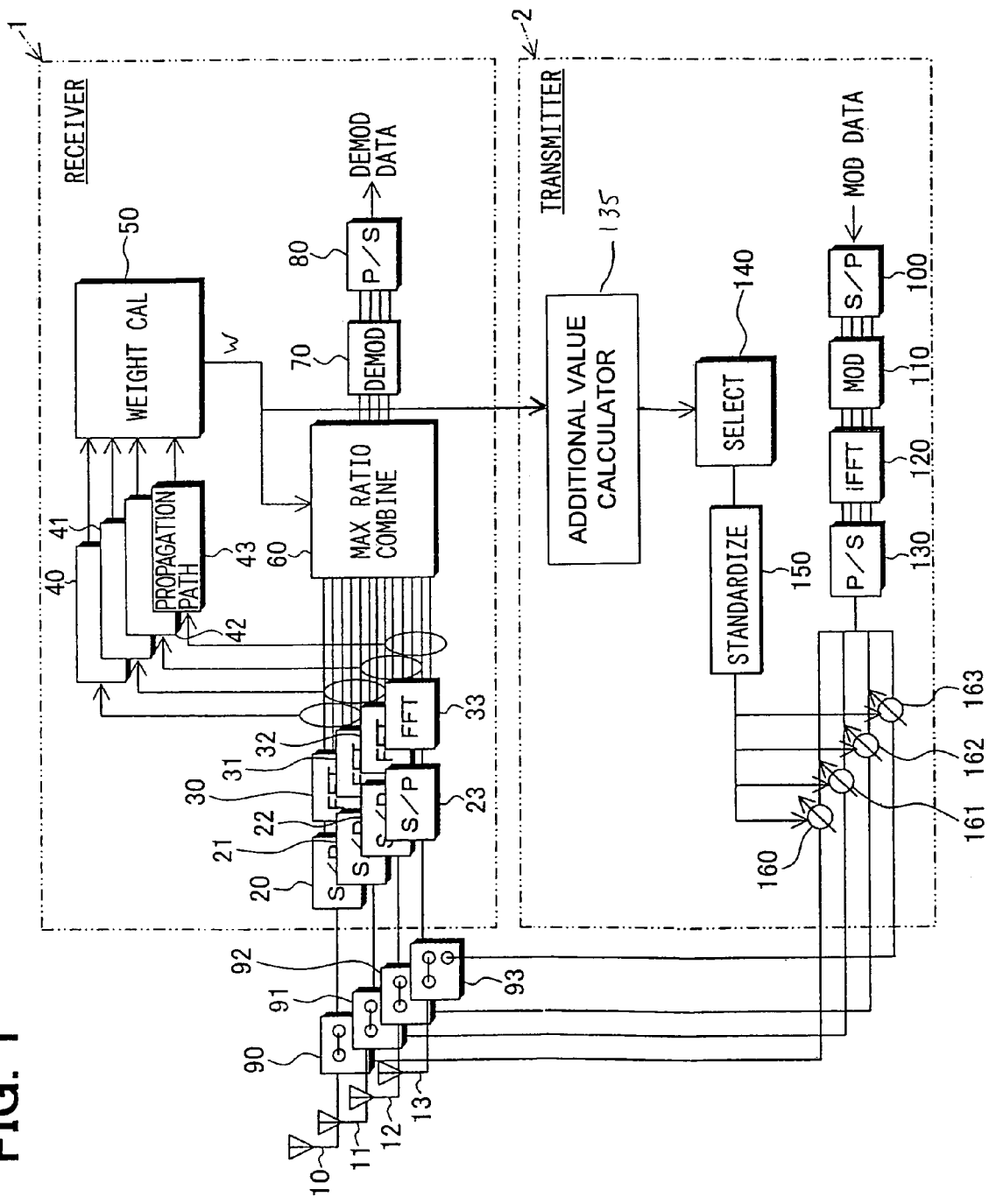
FIG. 1 shows a block diagram of an OFDM transceiver according to a first embodiment of the present invention.
Figure 4:
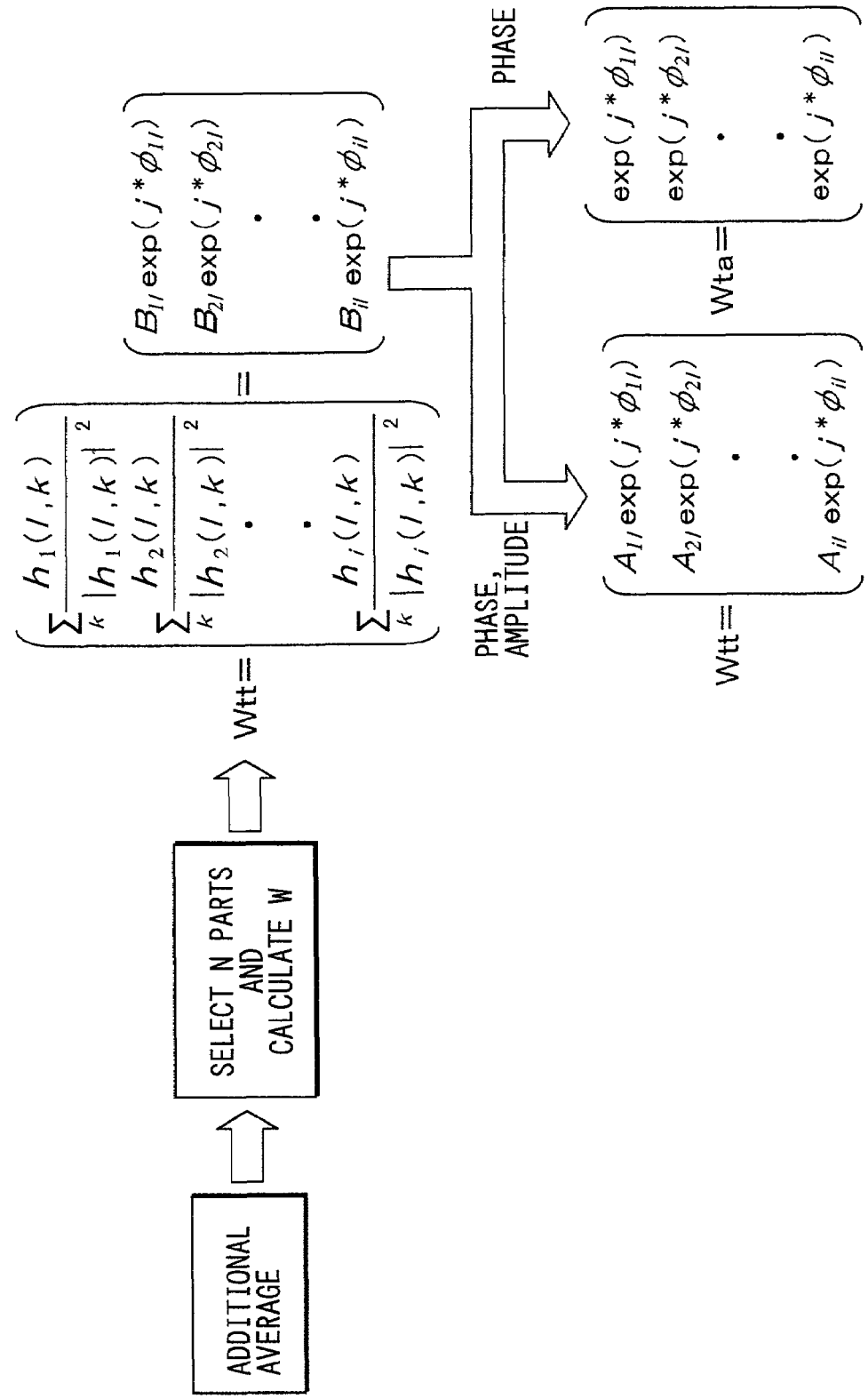
FIG. 4 shows mathematical expressions for explaining operation of the OFDM transceiver according to a second embodiment of the present invention.

The present invention will be described further with reference to various embodiments shown in the drawings.

FIRST EMBODIMENT

Referring FIG. 1, an OFDM system transceiver has a receiver 1, a transmitter 2, antenna elements 10–13 and switches 90–93. The receiver 1 has S/P converters 20–23, FFTs 30–33, propagation path estimators 40–43, a weight calculator 50, a maximum ratio combining processor 60, a demodulator 70 and a P/S converter 80.

Figure 7:
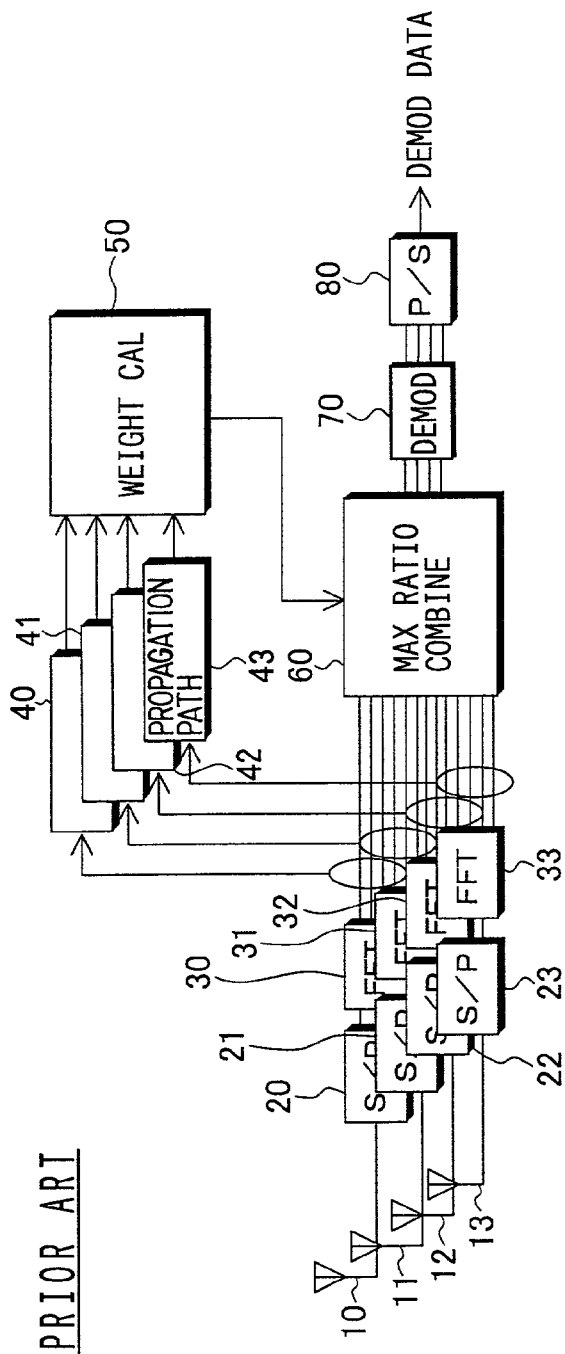
FIG. 7 shows a block diagram of a prior art OFDM transceiver.
Figure 8:
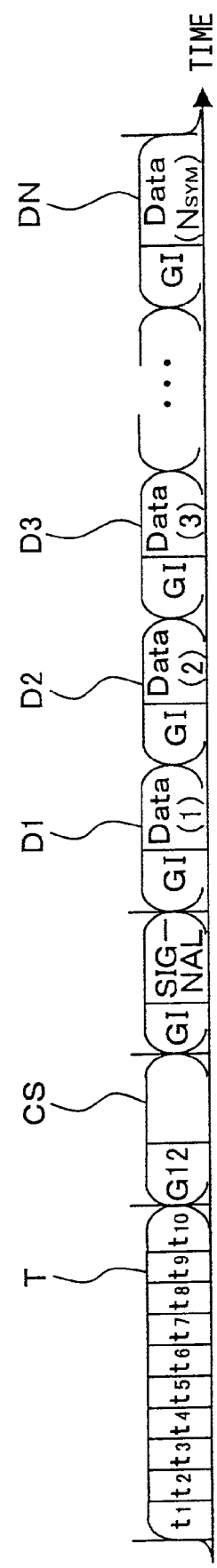
FIG. 8 shows a format example of the OFDM signal of the prior art OFAM transceiver in FIG. 7.
Figure 9C:
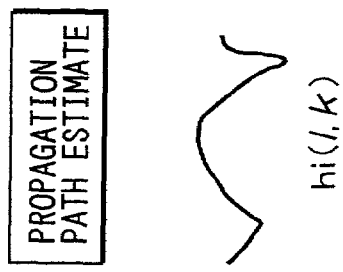
FIG. 9C shows estimated propagation path.
Figure 9A:
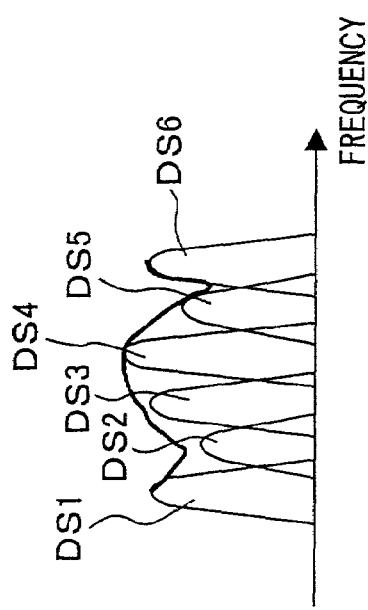
FIG. 9A shows respective data sub-carrier signals that are calculated by FFT of the prior art transceiver in FIG. 7.
Figure 9B:
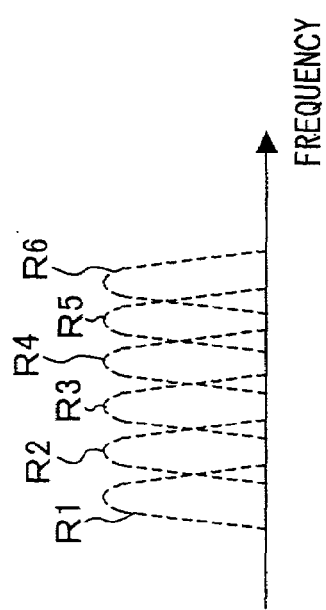
FIG. 9B shows respective replicas of the known sub-carrier signals.

The transmitter 2 has an S/P converter 100, a modulator 110, an inverse FFT (iFFT) 120, a P/S converter 130, an additional value calculator 135, a weight selector 140, a standardizing part 150, and multipliers 160–163. Incidentally, in FIG. 1, the same elements as in FIG. 7 are designated by the same reference numbers.

The S/P converter 100 converts serial modulation data into parallel signals. The modulator 110 digitally modulates the parallel signals by a technique such as BPSK, QPSK, 16QAM or the like and outputs the modulated data to the iFFT 120. The iFFT 120 inverse Fourier-transforms the modulated data into transmission data signals. The respective transmission data signals include frequency domain transmission sub-carrier signals.

The P/S converter 130 converts the parallel transmission sub-carrier signals into serial signals. The additional value calculator 135 and the weight selector 140 select a transmission weight based on a maximum ratio combining weight W. The standardizing part 150 standardizes amplitudes of the selected transmission weight based on a dynamic range of the transmitter 2 and outputs the standardized transmission weight.

The multipliers 160–163 are provided for each of the antenna elements 10–13. The multipliers 160–163 multiply the standardized transmission weight by a serial signal and output multiplied signals to the respective antenna elements 10–13. The switches 90–93 are provided for each of the antenna elements 10–13. The switches 90–93 connect one of the receiver 1 and the transmitter 2 to the antenna elements 10–13, and disconnect the other of the receiver 1 and the transmitter 2 from the antenna elements 10–13.

Operation of the transceiver of the present embodiment is described. First, during signal reception, the switches 90–93 connect respective S/P converters 20–23 of the receiver 1 to respective antenna elements 10–13, and disconnect respective multipliers 160–163 of the transmitter 2 from respective antenna elements 10–13. Therefore, the OFDM signals received from the antenna elements 10–13 are input to the receiver 1 through the switches 90–93. Then, the maximum ratio combining weight W is calculated by the weight calculator 50 and is input from the weight selector 140.

On the other hand, during signal transmission, the switches 90–93 disconnect respective S/P converters 20–23 of the receiver 1 from the respective antenna elements 10–13, and connect the respective multipliers 160–163 of the transmitter 2, to the respective antenna elements 10–13.

In the transmitter 2, the S/P converter 100 converts serial modulation data into parallel signals. The modulator 110 digitally modulates the parallel signals and outputs the modulated data to the iFFT 120. The iFFT 120 inverse Fourier-transforms the modulated data into transmission data signals. The P/S converter 130 converts the parallel transmission data signals into serial signals.

The additional value calculator 135 and the weight selector 140 select a transmission weight by the maximum ratio combining weight W as follows.

As shown in FIG. 2, the maximum ratio combining weight W shown in mathematical expression 1 is represented as a matrix of (number of the antenna elements)× (number of the data sub-carrier signals). A denominator of each element of the maximum ratio combining weight W shows the scale $\{|h_i(l,k)|^2\}$ of the propagation path estimating value. A vector P shown in mathematical expression (3) below is calculated at the additional value calculator 135 by adding the denominators of the maximum ratio combining weight W in the same respective column. The vector P includes the additional value P(l,k) in each column. The additional value P(l,k) is shown in mathematical expression (4).

$$P = [p(1, 1)\ p(1, 2)\ p(1, 3)\ \ldots\ p(1, k)] \qquad (3)$$

$$P(f, k) = \sum_{i=1}^{M} |hi(f, k)|^2 \qquad (4)$$

Incidentally, as shown in mathematical expression (2), each of the denominators uniformly scales the composition signals $z(f, k)$ with respect to the respective data sub-carrier signals.

Next, the maximum value Pmax of the additional value P(f,k) is calculated. The maximum value Pmax indicates sub-carrier signals with maximum signal levels of all received known sub-carrier signals. Accordingly, elements of the maximum ratio combining weight W corresponding to the maximum value Pmax is a weight with the highest reliability of the additional values P. Further, a column order of the maximum value Pmax is calculated, and thereafter respective elements of maximum ratio combining weight W corresponding to the maximum value Pmax with the column order are selected at the weight selector 140 as transmission weight Wtx (selector).

When column order "n" is selected, be cause the maximum ratio combining weight W is expressed as mathematical expression (5) using polar coordinates, the weight Wt is expressed as mathematical expression (6).

$$W = \begin{pmatrix} A_{11}\exp(j*\theta_{11}) & A_{11}\exp(j*\theta_{12}) & \cdots & A_{11}\exp(j*\theta_{1k}) \\ A_{21}\exp(j*\theta_{21}) & A_{22}\exp(j*\theta_{22}) & \cdots & A_{2k}\exp(j*\theta_{2k}) \\ \vdots & \vdots & & \vdots \\ A_{i1}\exp(j*\theta_{i1}) & A_{i2}\exp(j*\theta_{i2}) & \cdots & A_{ik}\exp(j*\theta_{ik}) \end{pmatrix} \qquad (5)$$

$$Wt = \begin{pmatrix} A_{1n}\exp(j*\theta_{1n}) \\ A_{2n}\exp(j*\theta_{2n}) \\ \vdots \\ A_{in}\exp(j*\theta_{in}) \end{pmatrix} \qquad (6)$$

Subsequently, the phases are drawn from the weight Wt by removing the amplitudes to enable transmission weight Wtx to be calculated as shown in mathematical expression (7). The transmission weight Wtx is standardized by the standardizing part 150. Further, the standardizing part 150 outputs the standardized transmission weight Wtx to the multipliers 160–1163, and it is set at the multipliers 160–163 (output means).

$$Wtx = \begin{pmatrix} \exp(j*\theta_{1n}) \\ \exp(j*\theta_{2n}) \\ \vdots \\ \exp(j*\theta_{in}) \end{pmatrix} \quad (7)$$

In this way, the weight selector 140 selects the transmission weight Wtx based on the maximum ratio combining weight W. Also, the transmission weight Wtx is set at the multipliers 160–163. Accordingly, it is possible to simply and easily form the transmission beam.

SECOND EMBODIMENT

In the second embodiment, an average of at least two elements of maximum ratio combining weight W is used as transmission weight Wtz. Specifically, an additional value calculator 135 and a weight selector 140 select the transmission weight Wtz as follows.

First, respective elements P (∫, k) of vector P are arranged based on their respective scaled values. Thereafter, n parts of the elements that are larger than the other elements are selected, thereby selecting n parts of the elements with the highest reliability.

Next, matrices corresponding to the selected n parts of the elements are chosen from the maximum ratio composition weight W. The chosen elements are shown in the matrix form of (n)×(number of the sub-carrier signals) as mathematical expression (8).

$$WR = \begin{pmatrix} \frac{h_1(f,1)}{|h_1(f,1)|^2} & \frac{h_1(f,16)}{|h_1(f,16)|^2} & \frac{h_1(f,32)}{|h_1(f,32)|^2} & \frac{h_1(f,37)}{|h_1(f,37)|^2} \\ \frac{h_2(f,1)}{|h_2(f,1)|^2} & \frac{h_2(f,16)}{|h_2(f,16)|^2} & \frac{h_1(f,32)}{|h_1(f,32)|^2} & \frac{h_2(f,37)}{|h_2(f,37)|^2} \\ \vdots & \vdots & \vdots & \vdots \\ \frac{h_i(f,1)}{|h_i(f,1)|^2} & \frac{h_i(f,16)}{|h_i(f,16)|^2} & \frac{h_i(f,32)}{|h_i(f,32)|^2} & \frac{h_i(f,32)}{|h_i(f,37)|^2} \end{pmatrix} \quad (8)$$

In mathematical expression (8), orders k of the n parts of the sub-carrier signals are, for example, 1, 16, 32 and 37 (k=1, 16, 17, 32).

Further, a weight Wtt shown in mathematical expression 9 is calculated by respectively adding the same column (the same sub-carrier) elements of the matrix WR. The weight Wtt includes elements of respective antenna elements 10–13. Also, the phases are drawn from the weight Wtt by removing the amplitudes to enable the transmission weight Wta to be calculated as shown in mathematical expression 7.

Thus, the transmission weight Wta is standardized by a standardizing part 150. The standardizing part 150 outputs the standardized transmission weight Wta to the multipliers 160–163, and it is set at multipliers 160–163.

$$k = 2, 16, 33, 37$$

$$Wtt = \begin{pmatrix} \sum_k \frac{h_1(f,1)}{|h_1(f,1)|^2} \\ \sum_k \frac{h_2(f,1)}{|h_2(f,1)|^2} \\ \vdots \\ \sum_k \frac{h_i(f,1)}{|h_i(f,1)|^2} \end{pmatrix} = \begin{pmatrix} B_{1j}\exp(j*\theta_{1j}) \\ B_{2j}\exp(j*\theta_{2j}) \\ \vdots \\ B_{ij}\exp(j*\theta_{ij}) \end{pmatrix} \quad (9)$$

$$Wta = \begin{pmatrix} \exp(j*\theta_{1j}) \\ \exp(j*\theta_{2j}) \\ \vdots \\ \exp(j*\theta_{ij}) \end{pmatrix} \quad (10)$$

THIRD EMBODIMENT

In the third embodiment, a transmission weight is set with respect to respective antenna elements 10–13 and respective sub-carrier signals.

Figure 5:
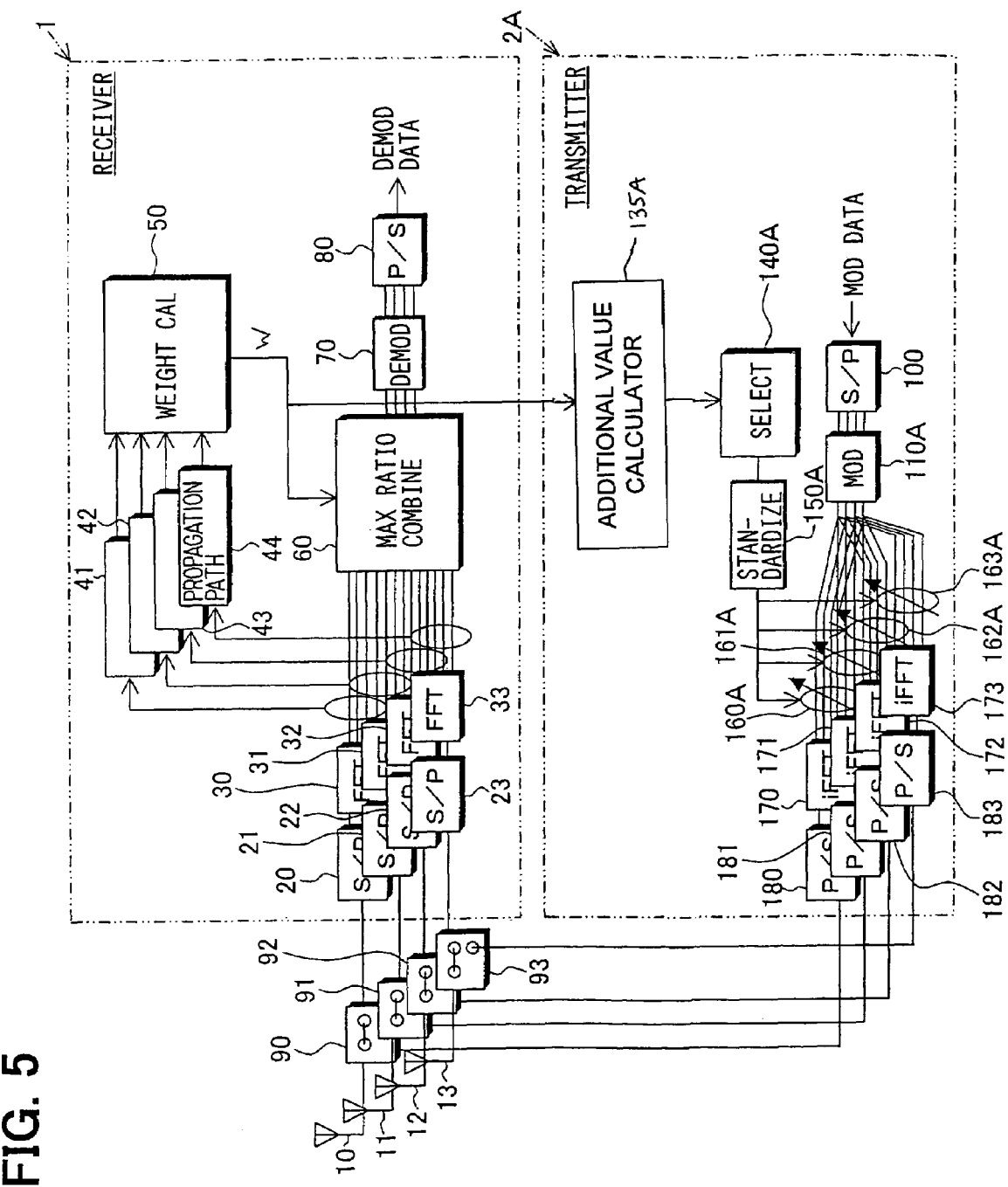
FIG. 5 shows a block diagram of an OFDM transceiver according to a third embodiment of the present invention.
Figure 6:
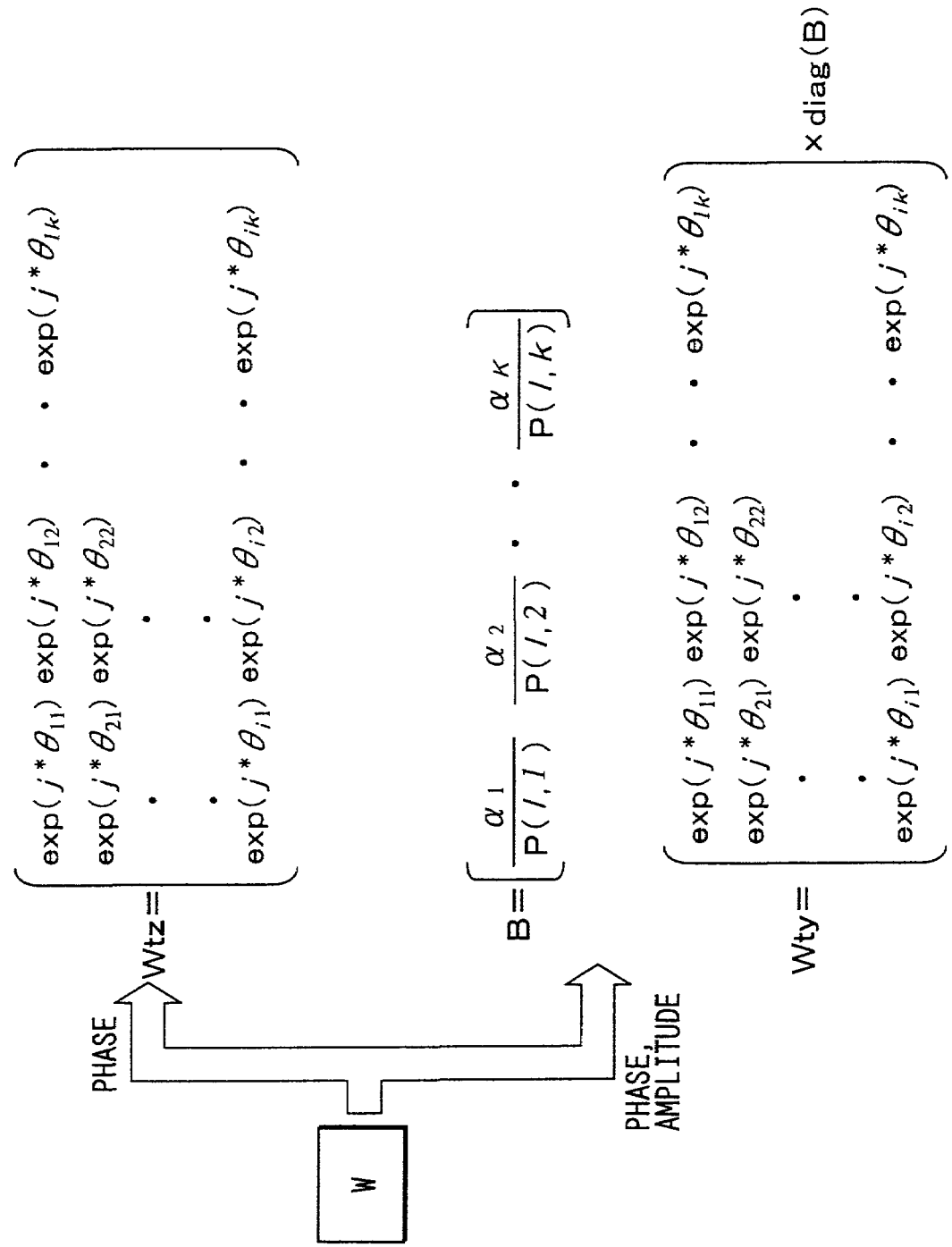
FIG. 6 shows mathematical expressions for explaining operation of the OFDM transceiver according to the third embodiment of the present invention.

Referring to FIG. 5, a transmitter 2A is adopted instead of the transmitter 2 of the first embodiment. The transmitter 2A has an S/P converter 100, a modulator 100A, iFFTs 170–173, P/S converters 180–183, an additional value calculator 135A, a weight selector 140A, a standardizing part 150A and multipliers 160A–163A. Incidentally, the other elements in FIG. 5 are basically the same as the elements in FIG. 1.

In the transmitter 2A, the S/P converter 100 converts serial modulation data into parallel signals. The modulator 110A digitally modulates the parallel signals and outputs modulated data. The multipliers 160A–163A multiply transmission weight by the modulated data and output multiplied signals to the respective iFFTs 170–173.

The iFFTs 170–173 inverse Fourier-transform the multiplied signals into transmission data signals. The transmission data signals include frequency domain transmission sub-carrier signals. In the present third embodiment, the multiplied signals are adopted as the transmission sub-carrier signals.

The P/S converters 180–183 convert the parallel transmission signals into serial signals and output them to the antenna elements 10–13 through the switches 90–93. The weight selector 140A selects transmission weight by a maximum ratio combining weight W. The standardizing part 150A standardizes amplitudes of the selected transmission weight based on a dynamic range of the transmitter 2A and outputs the standardized transmission weight.

In the transmitter 2A the weight selector 140A outputs only phases of the maximum ratio combining weight W to the multipliers 160–163 as the transmission weight Wtz shown in mathematical expression (11). Therefore, the transmission weight Wtz is set at respective transmission sub-carrier signals.

$$Wtz = \begin{pmatrix} \exp(j*\theta_{11}) & \exp(j*\theta_{12}) & \cdots & \exp(j*\theta_{1k}) \\ \exp(j*\theta_{21}) & \exp(j*\theta_{22}) & \cdots & \exp(j*\theta_{2k}) \\ \vdots & \vdots & & \vdots \\ \exp(j*\theta_{i1}) & \exp(j*\theta_{i2}) & \cdots & \exp(j*\theta_{ik}) \end{pmatrix} \quad (11)$$

Accordingly, the P/S converter 130 converts the parallel transmission signals into serial signals and outputs them to the antenna elements 10–13 via switches 90–93. Thus, the transmission beams of the antennas 10–13 are formed.

MODIFICATIONS

The above described embodiments of the present invention may be modified without departing from the spirit or scope of the present invention. For example, in the first embodiment, the phases are drawn from the weight Wt by removing the amplitudes to calculate the transmission weight Wtx. However, the weight Wt can be set at the multipliers 160–163 instead of at the transmission weight Wtx. In this case, not only phases of the weight Wt but also amplitudes thereof are set at the multipliers 160–163.

In the second embodiment, the transmission weight Wta is set at the multipliers 160–163 through the standardizing part 150. However, the weight Wtt can be set at multipliers 160–163 instead of the transmission weight Wta. In this case, not only phases of the weight Wtt but also amplitudes thereof are set at the multipliers 160–163.

In the third embodiment, only phases of the maximum ratio combining weight W are output to the multipliers 160–163 as the transmission weight Wtz. However, a transmission weight Wty can be adopted instead of the transmission weight Wtz. That is, inverse numbers of respective elements of the vector P shown in the mathematical expression 3 may be calculated and multiplied by scaling factor a to calculate a vector B shown in mathematical expression (12).

$$B = \begin{pmatrix} \frac{\alpha_1}{P(f,1)} & \frac{\alpha_2}{P(f,1)} & \cdots & \frac{\alpha_k}{P(f,1)} \end{pmatrix} \quad (12)$$

Further, as shown in mathematical expression (13), the vector B is multiplied by the transmission weight Wtz shown in mathematical expression (11). The multiplied resultant is used as the transmission weight Wty and is output to the multipliers 160–163.

$$Wty = \begin{pmatrix} \exp(j*\theta_{11}) & \exp(j*\theta_{12}) & \cdots & \exp(j*\theta_{1k}) \\ \exp(j*\theta_{21}) & \exp(j*\theta_{22}) & \cdots & \exp(j*\theta_{2k}) \\ \vdots & \vdots & & \vdots \\ \exp(j*\theta_{i1}) & \exp(j*\theta_{i2}) & \cdots & \exp(j*\theta_{ik}) \end{pmatrix} \times dial(B) \quad (13)$$

While the above description is of the preferred embodiments of the present invention, it should be appreciated that the invention may be modified, altered, or varied without deviating from the scope and fair meaning of the following claims.

What is claimed is:

1. An orthogonal frequency division multiplexing (OFDM) system transceiver comprising:
    a plurality of antenna elements for receiving known frequency domain reception signals including known reception sub-carrier signals and frequency domain reception data signals including reception sub-carrier signals;
    a Fourier transformer for transforming the known reception signals with respect to each of the antenna elements to obtain the known reception sub-carrier signals and the reception data signals with respect to each of the antenna elements to obtain the reception data sub-carrier signals;
    an estimator for estimating propagation path estimating values for each of the reception data sub-carrier signals with respect to each of the known reception sub-carrier signals based on each of the known reception sub-carrier signals;
    a weight calculator for calculating a maximum ratio combining weight to combine the reception data sub-carrier signals of each of the antenna elements based on the propagation path estimating signals of each of the known reception sub-carrier signals;
    setting means for setting a transmission weight based on the maximum ratio combining weight;
    a generator for generating a transmission data signal by arranging transmission sub-carrier signals on the frequency axis; and
    a plurality of multipliers at the respective antenna elements for multiplying the transmission data signals by the transmission weight and for outputting the multiplied resultant signals to the respective antenna elements.
    wherein the weight calculator calculates respective weights for each of the antenna elements and the reception data sub-carrier signals as the maximum ratio combining weight,
    wherein the setting means includes an addition means, a selector and an output means,
    wherein the addition means calculates respective additional values by adding scales of the respective propagation estimation values and the respective known reception sub-carrier signals,
    wherein the selector selects a maximum value from the additional values and a weight that corresponds to the maximum value from the maximum ratio combining weight, and
    wherein the output means outputs the selected weight to the multiplier as the transmission weight.

2. An OFDM system transceiver according to claim 1, wherein the output means outputs phase information of the selected weight as the transmission weight.

3. An OFDM system transceiver according to claim 1, wherein the output means outputs phase information and amplitude information of the selected weight as the transmission weight.

4. An orthogonal frequency division multiplexing (OFDM) system transceiver comprising:
    a plurality of antenna elements for receiving known frequency domain reception signals including known reception sub-carrier signals and frequency domain reception data signals including reception sub-carrier signals;
    a Fourier transformer for transforming the known reception signals with respect to each of the antenna elements to obtain the known reception sub-carrier signals and the reception data signals with respect to each of the antenna elements to obtain the reception data sub-carrier signals;

an estimator for estimating propagation path estimating values for each of the reception data sub-carrier signals with respect to each of the known reception sub-carrier signals based on each of the known reception sub-carrier signals;

a weight calculator for calculating a maximum ratio combining weight to combine the reception data sub-carrier signals of each of the antenna elements based on the propagation path estimating signals of each of the known reception sub-carrier signals;

setting means for setting a transmission weight based on the maximum ratio combining weight;

a generator for generating a transmission data signal by arranging transmission sub-carrier signals on the frequency axis; and a plurality of multipliers at the respective antenna elements for multiplying the transmission data signals by the transmission weight and for outputting the multiplied resultant signals to the respective antenna elements, wherein the setting means includes averaging means and output means, wherein the averaging means calculates an average weight by averaging at least two of the maximum ratio combining weights, each of which is calculated using the known reception sub-carrier signals, which are received at the same time, and wherein the output means outputs the average weight to the multiplier as the transmission weight.

5. An OFDM system transceiver according to claim 4, wherein the output means outputs phase information of the average weight as the transmission weight.

6. An OFDM system transceiver according to claim 4, wherein the output means outputs phase information and amplitude information of the average weight as the transmission weight.

7. An orthogonal frequency division multiplexing system transceiver comprising:

a plurality of antenna elements for receiving known frequency domain reception signals including known reception sub-carrier signals and frequency domain reception data signals including reception sub-carrier signals;

a Fourier transformer for transforming the known reception signals with respect to each of the antenna elements to obtain the known reception sub-carrier signals and the reception data signals with respect to each of the antenna elements to obtain the reception data sub-carrier signals;

an estimator for estimating propagation path estimating values for each of the reception data sub-carrier signals with respect to each of the known reception sub-carrier signals based on each of the known reception sub-carrier signals;

a weight calculator for calculating a maximum ratio combining weight to combine the reception data sub-carrier signals of each of the antenna elements based on the propagation path estimating signals of each of the known reception sub-carrier signals;

setting means for setting a transmission weight based on the maximum ratio combining weight;

a generator for generating a transmission data signal by arranging transmission sub-carrier signals on the frequency axis; and a plurality of multipliers at the respective antenna elements for multiplying the transmission data signals by the transmission weight and for outputting the multiplied resultant signals to the respective antenna elements, wherein the setting means calculates the transmission weight based on a portion of elements of the maximum ratio combining weight.

8. An orthogonal frequency division multiplexing system transceiver comprising:

a plurality of antenna elements for receiving known frequency domain reception signals including known reception sub-carrier signals and frequency domain reception data signals including reception sub-carrier signals;

a Fourier transformer for transforming the known reception signals with respect to each of the antenna elements to obtain the known reception sub-carrier signals and the reception data signals with respect to each of the antenna elements to obtain the reception data sub-carrier signals;

an estimator for estimating propagation path estimating values for each of the reception data sub-carrier signals with respect to each of the known reception sub-carrier signals based on each of the known reception sub-carrier signals;

a weight calculator for calculating a maximum ratio combining weight to combine the reception data sub-carrier signals of each of the antenna elements based on the propagation path estimating signals of each of the known reception sub-carrier signals;

setting means for setting a transmission weight based on the maximum ratio combining weight;

a generator for generating a transmission data signal by arranging transmission sub-carrier signals on the frequency axis; and a plurality of multipliers at the respective antenna elements for multiplying the transmission data signals by the transmission weight and for outputting the multiplied resultant signals to the respective antenna elements, wherein the setting means selects several matrices of the maximum ratio combining weight that are larger than the other elements thereof, and sets the transmission weight based on the several elements.

9. An orthogonal frequency division multiplexing (OFDM) system transmission method comprising:

receiving known reception signals including known frequency domain reception sub-carrier signals and reception data signals including frequency domain reception sub-carrier signals;

Fourier-transforming the known reception signals with respect to each of antenna elements to obtain the known reception sub-carrier signals and the reception data signals with respect to each of the antenna elements to obtain the reception data sub-carrier signals;

estimating propagation path estimating values of each of the reception data sub-carrier signals with respect to each of the known reception sub-carrier signals based on each of the known reception sub-carrier signals;

calculating a maximum ratio combining weight to combine the reception data sub-carrier signals of each of the antenna elements based on the propagation path estimating signals of each of the known reception sub-carrier signals;

setting a transmission weight based on the maximum ratio combining weight;

generating a transmission data signal by arranging transmission sub-carrier signals in the frequency domain; and multiplying the transmission data signals by the transmission weight for outputting the multiplied resultant signals to the respective antenna elements, wherein the calculating calculates respective weights for each of the antenna elements and the reception data sub-carrier signals as the maximum ratio combining weight, the setting includes calculating respective additional values by adding scales of the respective propagation estimation values and the respective known reception sub-carrier signals, selecting a maximum value from the additional values and a weight that corresponds to the maximum value from the maximum ratio combining weight, and outputting the selected weight to the multiplier as the transmission weight.

10. An OFDM system transmission method according to claim 9, wherein the outputting includes outputting phase information of the selected weight as the transmission weight.

11. An OFDM system transmission method according to claim 9, wherein the outputting includes outputting phase information and amplitude information of the selected weight as the transmission weight.

12. An OFDM system transmission method comprising:

receiving known reception signals including known frequency domain reception sub-carrier signals and reception data signals including frequency domain reception sub-carrier signals;

Fourier-transforming the known reception signals with respect to each of antenna elements to obtain the known reception sub-carrier signals and the reception data signals with respect to each of the antenna elements to obtain the reception data sub-carrier signals;

estimating propagation path estimating values of each of the reception data sub-carrier signals with respect to each of the known reception sub-carrier signals based on each of the known reception sub-carrier signals;

calculating a maximum ratio combining weight to combine the reception data sub-carrier signals of each of the antenna elements based on the propagation path estimating signals of each of the known reception sub-carrier signals;

setting a transmission weight based on the maximum ratio combining weight;

generating a transmission data signal by arranging transmission sub-carrier signals in the frequency domain; and multiplying the transmission data signals by the transmission weight for outputting the multiplied resultant signals to the respective antenna elements, wherein the setting includes calculating an average weight by averaging at least two of the maximum ratio combining weights, each of which is calculated using the known reception sub-carrier signals, which are received at the same time, and outputting the average weight to the multiplier as the transmission weight.

13. An OFDM system transmission method according to claim 12, wherein the outputting includes outputting phase information of the average weight as the transmission weight.

14. An OFDM system transmission method according to claim 12, wherein the outputting includes outputting phase information and amplitude information of the average weight as the transmission weight.

* * * * *